(12) United States Patent
Tirpak

(10) Patent No.: US 12,120,381 B2
(45) Date of Patent: *Oct. 15, 2024

(54) SYSTEMS AND METHODS FOR PRE-CACHING MEDIA CONTENT

(71) Applicant: DISH Technologies LL.C., Englewood, CO (US)

(72) Inventor: Christopher Tirpak, Monument, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,087

(22) Filed: Nov. 6, 2023

(65) Prior Publication Data

US 2024/0073477 A1    Feb. 29, 2024

Related U.S. Application Data

(63) Continuation of application No. 16/439,065, filed on Jun. 12, 2019, now Pat. No. 11,849,174, which is a
(Continued)

(51) Int. Cl.
*H04N 21/433* (2011.01)
*H04L 65/612* (2022.01)
(Continued)

(52) U.S. Cl.
CPC ....... *H04N 21/4331* (2013.01); *H04L 65/612* (2022.05); *H04N 21/431* (2013.01);
(Continued)

(58) Field of Classification Search
CPC ............. H04N 21/4331; H04N 21/431; H04N 21/4384; H04N 21/472; H04N 21/482; H04L 65/612
See application file for complete search history.

(56) References Cited

U.S. PATENT DOCUMENTS 8,152,642 B2    4/2012    Ergen et al.
8,698,745 B2    4/2014    Reams
(Continued)

FOREIGN PATENT DOCUMENTS

WO    2012070064 A1    5/2012

OTHER PUBLICATIONS

Notice of Allowance from the United States Patent and Trademark Office for U.S. Appl. No. 17/068,997 entitled "Video Streaming System Preloading of Video Content" dated Nov. 2, 2023 (7 pages).
(Continued)

*Primary Examiner* — Kunal Langhnoja
(74) *Attorney, Agent, or Firm* — KW Law, LLP

(57) ABSTRACT

Methods, systems and devices to stream media content are described. A user interface is presented to a user via a media device. When the media device has determined that an interaction with the user interface has occurred (e.g., the user has begun scrolling through a list, or has performed a keyword search), the media device requests, from a media content source, a subset of first media content based on the interaction with the user interface and prior to selection of the first media content via the user interface. The subset of first media content is then displayed in response to the selection of the first media content.

19 Claims, 4 Drawing Sheets

Related U.S. Application Data continuation of application No. 14/789,032, filed on Jul. 1, 2015, now Pat. No. 10,349,116.

(60) Provisional application No. 62/097,246, filed on Dec. 29, 2014.

(51) Int. Cl.
*H04N 21/431* (2011.01)
*H04N 21/438* (2011.01)
*H04N 21/472* (2011.01)
*H04N 21/482* (2011.01)

(52) U.S. Cl.
CPC ....... *H04N 21/4384* (2013.01); *H04N 21/472* (2013.01); *H04N 21/482* (2013.01)

(56) References Cited

U.S. PATENT DOCUMENTS

| | | | |
|---|---|---|---|
| 8,898,713 | B1 | 11/2014 | Price |
| 9,210,355 | B2 | 12/2015 | Ergen et al. |
| 9,237,292 | B2 | 1/2016 | Schafer et al. |
| 10,298,995 | B1 | 5/2019 | Stumbo |
| 2001/0030660 | A1* | 10/2001 | Zainoulline ......... G06F 3/04812 715/720 |
| 2002/0112239 | A1* | 8/2002 | Goldman ......... H04N 21/25891 348/E7.075 |
| 2005/0129042 | A1 | 6/2005 | Muhonen et al. |
| 2006/0230229 | A1* | 10/2006 | Getzinger ........... G06F 12/0802 711/E12.017 |
| 2007/0157242 | A1* | 7/2007 | Cordray .......... H04N 21/44224 725/9 |
| 2007/0260743 | A1 | 11/2007 | Oijer |
| 2009/0046545 | A1* | 2/2009 | Blinnikka .............. G11B 27/34 369/30.06 |
| 2009/0150917 | A1 | 6/2009 | Huffman et al. |
| 2009/0269027 | A1 | 10/2009 | Bedingfield et al. |
| 2009/0307092 | A1 | 12/2009 | Gugliuzza et al. |
| 2010/0167646 | A1 | 7/2010 | Alameh et al. |
| 2010/0259144 | A1 | 10/2010 | Bevirt et al. |
| 2011/0283322 | A1 | 11/2011 | Hamano |
| 2012/0257120 | A1 | 10/2012 | Nakai |
| 2014/0040496 | A1 | 2/2014 | Moorthy et al. |
| 2014/0143823 | A1* | 5/2014 | Manchester ....... H04N 21/2662 725/116 |
| 2014/0368734 | A1 | 12/2014 | Hoffert et al. |
| 2015/0350277 | A1* | 12/2015 | Voris ...................... H04L 65/80 709/219 |
| 2016/0000930 | A1 | 1/2016 | Kolonin et al. |
| 2017/0242992 | A1 | 8/2017 | Olofsson |
| 2018/0000102 | A1 | 1/2018 | Jackson et al. |
| 2018/0000306 | A1 | 1/2018 | Caruso |

OTHER PUBLICATIONS

ISA-EPO, International Search Report International Application No. PCT/US2015/065855, mailed Mar. 3, 2016 (4 pages).

* cited by examiner

SYSTEMS AND METHODS FOR PRE-CACHING MEDIA CONTENT

CROSS-REFERENCE TO RELATED APPLICATIONS

This application is a continuation of U.S. patent application Ser. No. 16/439,065 filed on Jun. 12, 2019, which is a continuation of U.S. patent application Ser. No. 14/789,032 (now U.S. Pat. No. 10,349,116) filed on Jul. 1, 2015, which claims priority to U.S. Provisional Patent Application Ser. No. 62/097,246 filed on Dec. 29, 2014, the contents of each of which are hereby incorporated by reference.

TECHNICAL FIELD

The present disclosure generally relates to streaming media. More particularly, the following discussion relates to systems, methods, and devices for pre-caching media content in response to user interaction with the system.

BACKGROUND

Media streaming is an increasingly popular way of delivering television, movies and other media content to viewers. Media streams are typically point-to-point transmissions of digitized content that can be sent over the Internet or a similar network, and are often used to facilitate video on demand (VOD), remote storage digital video recorder (RSDVR), placeshifted media viewing and/or any number of other convenient services. Media streaming is often favored over other types of content delivery because of its versatility. Unlike traditional television broadcasts, for example, media streams can often be sent to a wide variety of devices, such as mobile phones, set top boxes and other television receivers, personal computers, tablet computers, video game consoles, and the like. Streaming media often allows media content to be delivered at any time and to any place that network connectivity is available, thereby allowing a high level of flexibility.

Media streaming devices typically provide a user interface in which a list or other graphical ordering of available movies, television shows, and other media content are presented to the user. The user may then browse through this list and select a desired title using a remote control device, a mouse, or any other form of input device. The user might also perform a search based on keyword, media content type, media source, or the like. Unfortunately, in the case of streaming media provided over the Internet or other network, the actual streaming of data might not begin until one or more seconds after the user has made a selection. The user may interpret this delay or "lag" as an undesirable characteristic of the software application and/or media device being used to display the media stream.

It is there is a need for systems, devices, and techniques for improving the responsiveness of user interfaces employed in connection with media streaming devices and the like. These and other desirable features and characteristics will become apparent from the subsequent detailed description and the appended claims, taken in conjunction with the accompanying drawings and this background section.

BRIEF SUMMARY

Several examples of systems, devices, methods, user interfaces are described for streaming media content. One exemplary embodiment provides a method in which a user interface (e.g., a list of titles) is presented to a user via a media device. When the media device has determined that an interaction with the user interface has occurred (e.g., the user has begun scrolling through a list, has performed a keyword search, or the like), the media device requests, from a media content source, a subset of first media content (e.g., one or more segments of multi-bitrate encoded stream) based on the interaction with the user interface and prior to selection of the first media content via the user interface. The subset of first media content is then displayed in response to the selection of the first media content. That is, the media device attempts to predict, based on interaction with the user interface, which media content is most likely to be selected by the user. Segments of the predicted media content may then be pre-cached and/or the downloading of segments from multiple media content may be prioritized based on the user interaction. In this way, the desired media content may be displayed almost immediately after being selected.

A system for streaming media content includes a media device configured to present a user interface and determine that an interaction with the user interface has occurred and a media content source. The media content source is configured to receive a request for a subset of first media content based on the interaction with the user interface and prior to selection of the first media content via the user interface. The media device is configured to receive the subset of first media content and display the subset of first media content in response to the selection of the first media content.

Alternate embodiments, aspects and other features are described in more detail herein.

BRIEF DESCRIPTION OF THE DRAWING FIGURES

Exemplary embodiments will hereinafter be described in conjunction with the following drawing figures, wherein like numerals denote like elements, and:

FIG. 1 is simplified, conceptual block diagram of a media streaming system in accordance with one embodiment;

FIGS. 2 and 3 present exemplary user interfaces in accordance with various embodiments.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Figure 1:
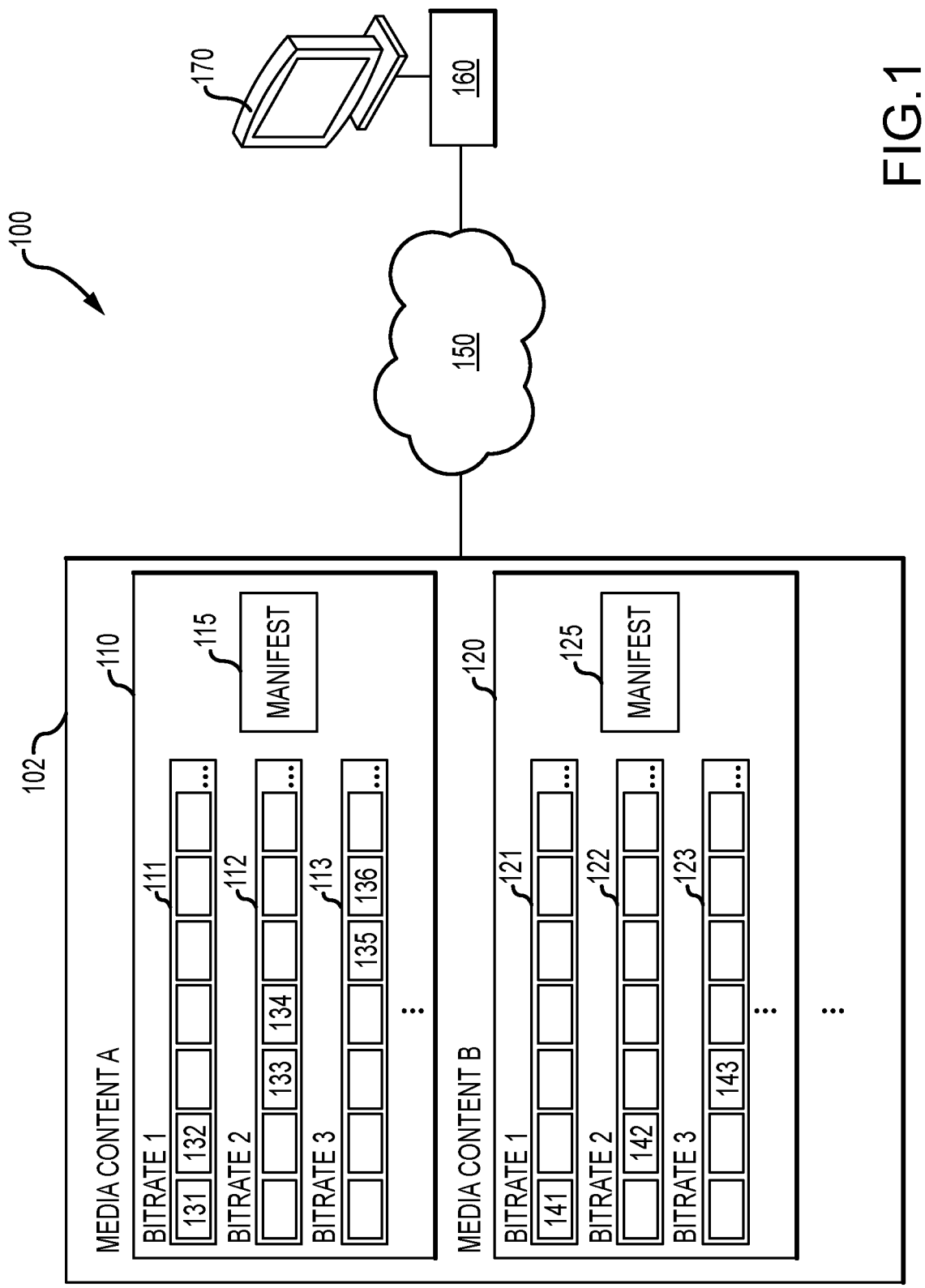

Referring to FIG. 1, a media streaming system 100 generally includes a media content source (or simply "content source") 102 communicatively coupled, over a network 150, to a media device 160 (with one or more associated displays 170). Device 160 may correspond to any combination of hardware and software configured to receive and process media streams from content source 102, including, for example, a mobile telephone, a computer system (such as desktop computer, laptop computer, tablet computer, or the like), a set top box, a television receiver, or a dedicated media player. Typically, a user operates device 160 to request a streaming media connection from content source 102. The application executed on the requesting device 160 may be a placeshifting application, an application to obtain IPTV content or video on demand, an RSDVR application, or any other application that obtains media streams for playback (via display 107) to the user. While the environment illustrated in FIG. 1 is shown as a single network 150, in practice the environment may include any number of wired and/or wireless network operating within the geographic proximity of a home, office or other structure and that are generally under the control of a single user, family or operator. A single family or business entity, for example, typically retains control of the router 104 and other computing hardware operating within home environment 102.

Content source 102 may provide streamed media to media device 160 in a variety of ways. In the illustrated embodiment, for example, content source 102 is illustrated as a multi-bitrate content delivery server. This allows system 100 (via an adaptive bitrate scheme, as is known in the art) to provide video to the user that optimizes image quality given the available bandwidth of network 150 in real-time as the media is being streamed. A variety of adaptive streaming protocols are known in the art, including, for example, MPEG-DASH, Adobe Dynamic Streaming, HTTP Live Streaming (HLS), upLynk, and Microsoft Smooth Streaming.

As illustrated in FIG. 1, content source 102 includes multiple movies, televisions shows, or other media content (in this example, media content 110, and media content 120) encoded and stored at two or more bitrates. Thus, media content 110 is stored at three different bitrates: bitrate 1 (111), bitrate 2 (112), and bitrate 3 (113), where bitrate 1 is lower (in terms of Kbps) than bitrate 2, bitrate 2 is lower than bitrate 3, and so on. Similarly, media content 120 is stored at three different bitrates: bitrate 121, bitrate 122, and bitrate 123. In practice, the illustrated bitrates (111, 112, 113, 121, 122, and 123) may correspond to any suitable bitrate now known or used in the future. For example, bitrate 111 may be 200 Kbps, bitrate 112 may be 400 Kbps, bitrate 113 may be 1.2 Mbps, etc.

The media content for each bitrate is stored as a sequential set of smaller segments, as illustrated. Within media content 110, for example, bitrate 111 includes segments 131 and 132, bitrate 112 includes segments 133 and 134, and bitrate 113 includes segments 135 and 136. Similarly, within media content 120, bitrate 121 includes segment 141, bitrate 122 includes segment 142, and bitrate 123 includes segment 143.

In the context of adaptive bitrate streaming, media content may be provided to media device at one bitrate at one time, and then at another bitrate at a subsequent time. For example, the first two segments 131 and 132 may be provided to media device 160 when the user first begins to watch media content 110, and then subsequently (e.g., when available bandwidth increases over network 150 and/or buffering of the media content is sufficient) segments 133, 134, 135, and 136 may be provided (i.e., high quality). Similarly, with respect to media content 120, segments 141, 142, and 143 may be provided sequentially to media device 160. Conversely, as bandwidth decreases, segments from lower bitrates (121 and 122) may be transmitted.

As illustrated, each media content 110, 120 includes a corresponding manifest (i.e., manifests 115 and 125, respectively). As is known in the art, the manifest is generally a file (e.g., an XML or JSON file) that specifies where within content source 102 each segment (131, 132, etc.) can be found for each bitrate (111, 112, 113). For example, in the case where content source 102 is an HTTP server with a hierarchical folder structure, manifest 115 might include uniform resource locators specifying, for each bitrate, the location of the various segments. In general, media device 160 will request and receive the manifest 115 prior to requesting the actual media content segments.

While adaptive bitrate streaming provides many advantages, in conventional streaming systems there can often be a significant delay between the time the user selects the desired media content and the time that streaming (and viewing) begins. This is due primarily to the delay in video segments (e.g., segments 131 and 132) traveling over network 150 to media device 160. As mentioned above, this is undesirable in that the user will often perceive this delay to be a property of the media device 160 itself (and/or its software).

In accordance with the present embodiment, however, certain predicted segments of media content are stored or "pre-cached" on media device 160 before the user selects media content based on the user's interaction with a user interface provided by media device 160. In this way, the desired media content can be viewed almost immediately after selection has been made.

Figure 4:
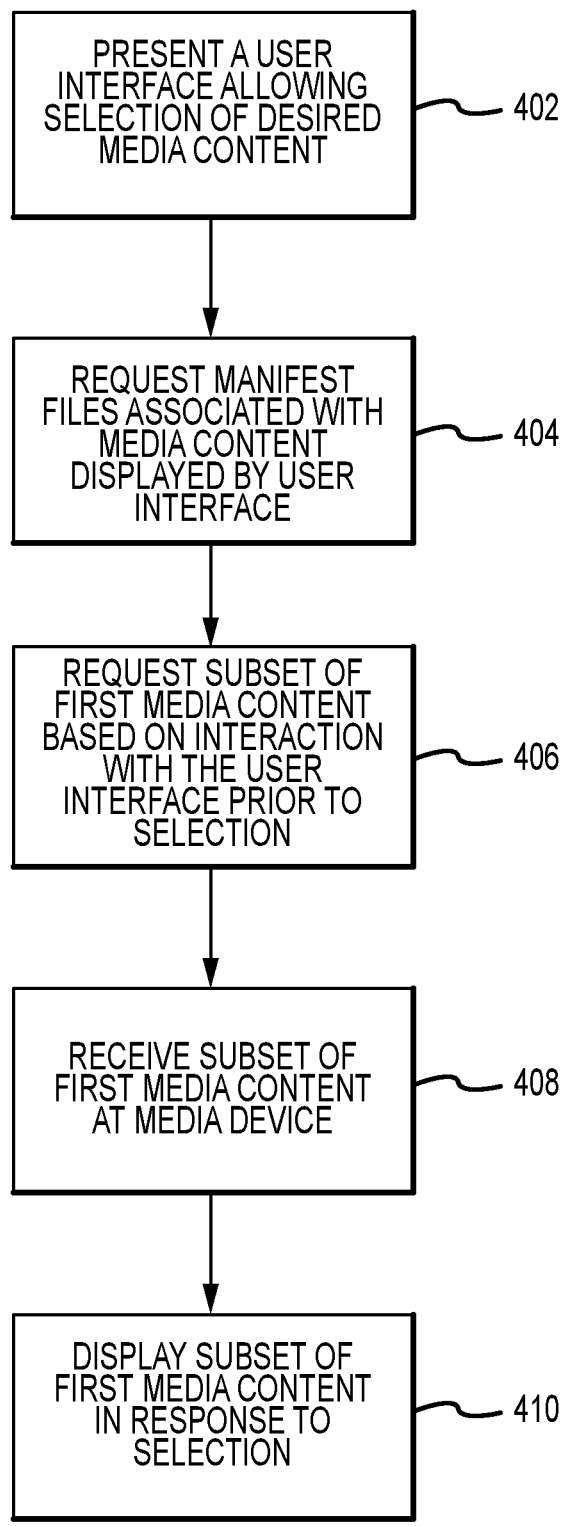
FIG. 4 is a flow chart depicting a method in accordance with one embodiment.

Referring to the flowchart of FIG. 4, a method in accordance with various embodiments can be described at a high level. Initially, as described in further detail below, the user is presented with a user interface that allows the user to the desired media content. This may be performed, for example, in response to the user entering an electronic program guide (EPG) mode, as is known in the art, and may take the form of a list of titles/identifiers, an ordered series of images associated with particular movies, or any other graphical depiction of media content. The media device then requests and receives manifest files (e.g., 115, 125 of FIG. 1) associated with the media content displayed, at that time, within the user interface (step 404). That is, if there are n titles displayed within the user interface, the media device attempts to download all n manifests as quickly as possible.

Based on the user's interaction with the user interface (e.g., which title is currently highlighted, pointed to, or otherwise focused on by the user at the moment), a subset of first media content (e.g., one or more segments, depending upon the length of each segment, network bandwidth, etc.) is requested from the media content source (step 408). Note that this step is performed before the user has actually selected the desired media content. The downloaded subset may include low bitrate segments (to reduce network usage), or high bit-rate segments as may be appropriate in an environment having significant bandwidth. Segments of differing bitrates may be downloaded.

Alternatively, in cases in which parallel streams are available, the system attempts to download one or more segments from each of the displayed titles, but download of the media content focused on by the user at that time is prioritized based on user interaction.

In another embodiment, wherein the user interface comprises a list of identifiers (e.g., titles) sorted by popularity, the subset of first media content is requested based on its popularity within the list of identifiers. That is, the system attempts to download the most popular titles first within any given list. In a further embodiment, the media device attempts to download a few segments of a large number of popular titles (e.g., the 100 top movies) during a "sleep" mode or other mode in which the network is not being used by the media device.

In another embodiment, the system learns, based on historical data (and an appropriate machine learning model) the user's behavior, and attempts to predict the desired media content based in part on such historical data. A variety of known machine learning algorithms may be employed for this purpose, and need not be described in further detail herein. Regardless of the particular algorithm being used, the system preferably tunes the algorithm over time as it learns the behavior of the user (or users).

Next, at step 408, the subset of first media content is received at the media device and is then displayed (step 410) in response to the user making the selection. As a result, since the selected media content was previously pre-cached at the media device, the delay between selection and viewing is significantly reduced.

Figure 2:
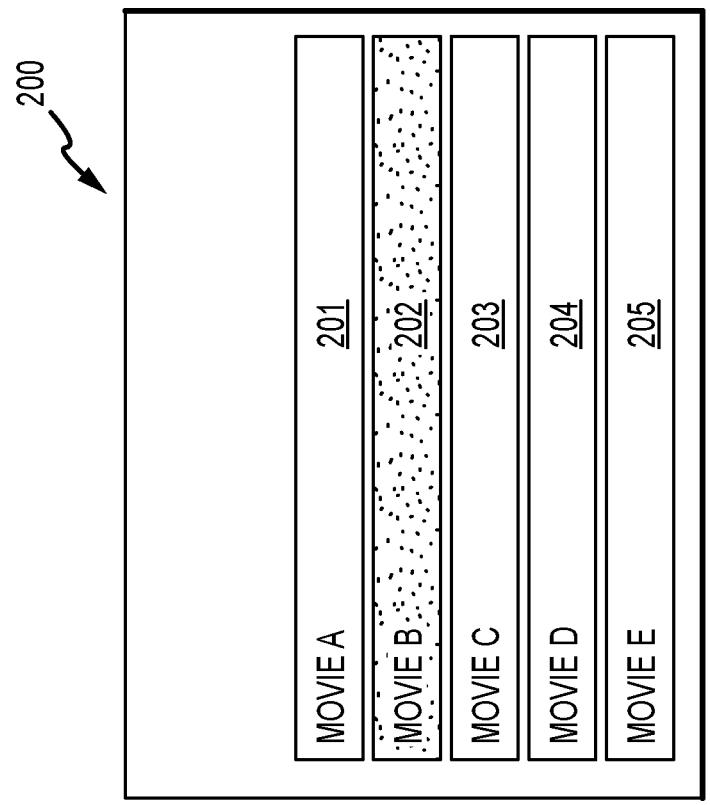

Having thus given an overview of the method of FIG. 4, the two example user interfaces of FIGS. 2 and 3 will now be described. Turning first to FIG. 2, user interface 200 includes, in simplified form, a vertical list including identifiers (text titles) associated with five movies, i.e., "Movie A" through "Movie E" (201-205). These titles may be arranged alphabetically, by time of showing, by channel, or any other attribute. In this regard, it will be appreciated that the list shown in FIG. 2 is not intended to be limiting, and that any form of list, carousel, thumbnail set, slideshow, or other graphical depiction of multiple items may be employed.

FIG. 2 also shows illustrates that the user is browsing through the list of titles and has briefly highlighted (via the shaded region) item 202 (Movie B). Again, the use of such shading is not intended to be limiting. Other methods of selection and highlighting may be employed, including cursors, outlined regions, and the like.

For the purpose of this example, it is assumed that FIG. 2 depicts user interface 200 before item 202 has been selected. That is, the user has not actuated a remote control button or other user interface component that actually requests that Movie B be streamed. At this point, however, the system (in accordance with the flow chart shown in FIG. 4) has preferably already requested that the manifests corresponding to items 201-205 be downloaded from the associated server or other content source. As mentioned previously, the manifest provides information regarding the location (e.g., URL), bit-rates, etc. of the available media content.

Furthermore, because the user is currently focusing on item 202, the media device attempts to download (using the information from the appropriate manifest) one or more segments of Movie B before the user has made a selection. If additional time is available (e.g., if the user spends a significant amount of time dwelling on information regarding Movie B), the media device may attempt to download Movies A, C, D, and E as well. In the event that the user scrolls to another page of listed media content, the prediction and download process will begin again based on the user's interaction.

Figure 3:
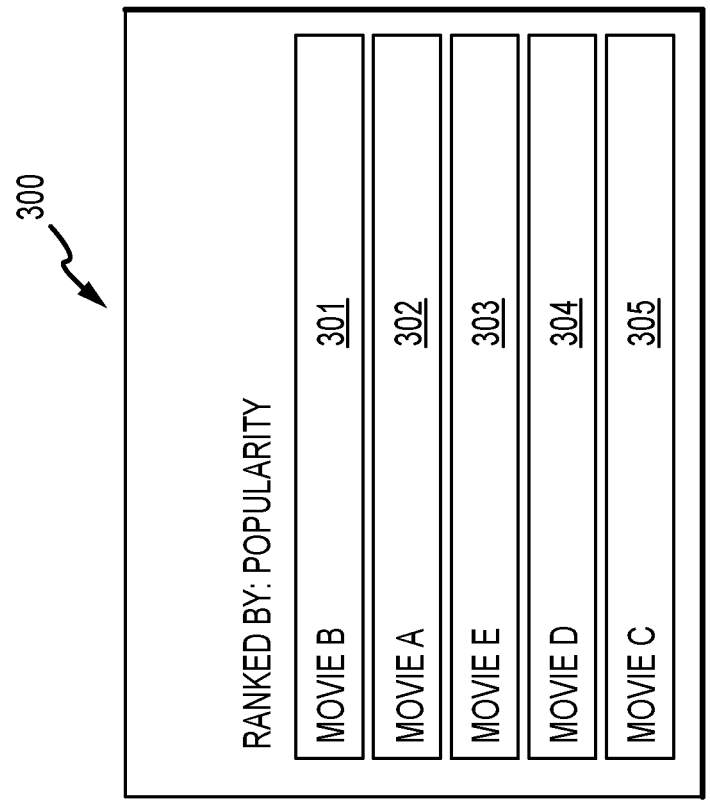

FIG. 3 depicts another embodiment in which the media content (items 301-305) have been arranged in order of popularity (as determined by one or more other viewers) with Movie B being the most popular, and Movie C being the least popular in this list. This list may have been populated, for example, in response to the user performing a keyword or other search. In this example, the media device would attempt to download one or more segments of Movie B under the assumption that the user is most likely to select the most popular item. As mentioned above, however, the system may utilize historical data to determine that this particular user is more likely to view the least popular, independent films rather than the more popular, big-budget films.

Figure 5:
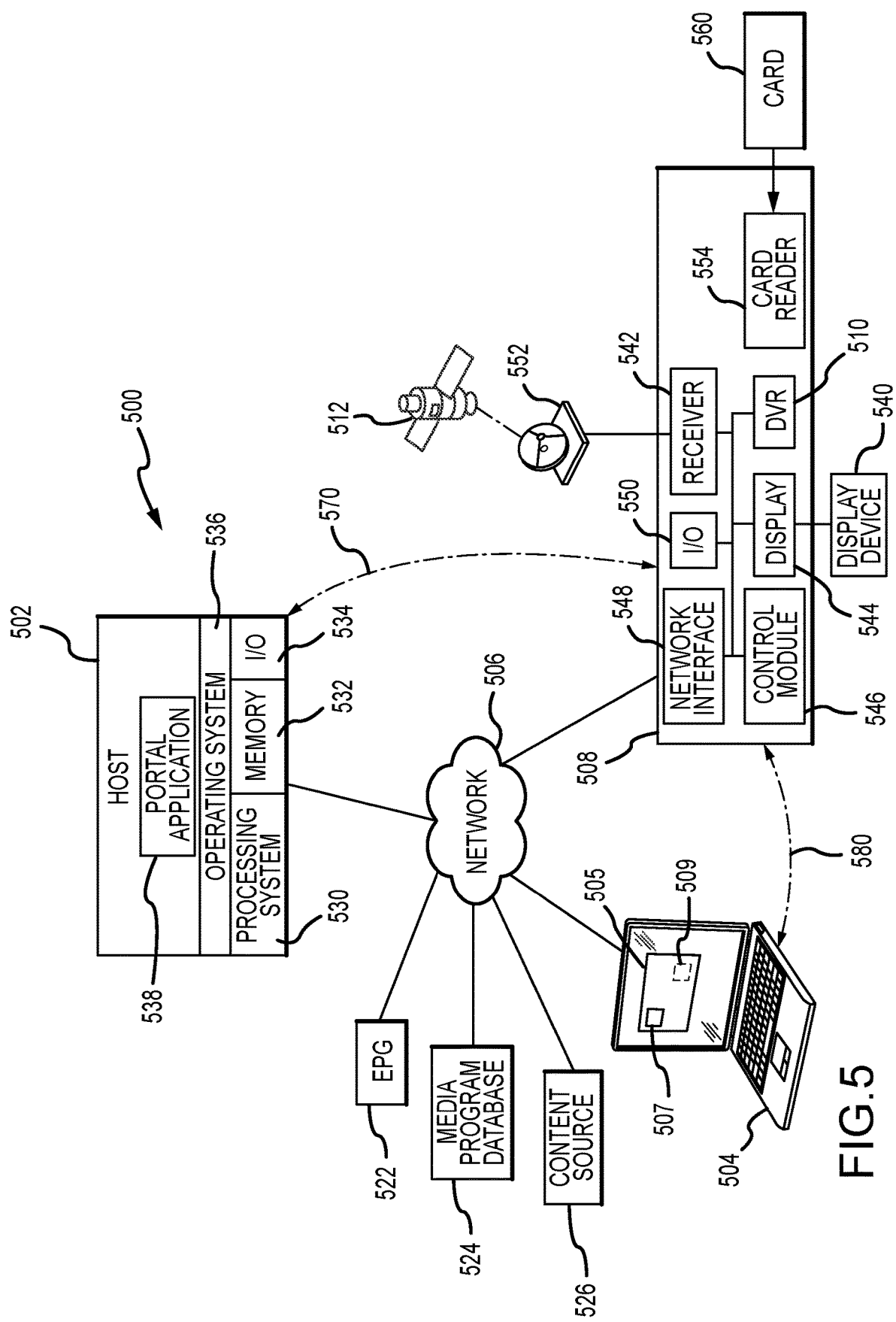
FIG. 5 is a block diagram of a system for placeshifting content from a media device to a client device in accordance with one or more embodiments.

The above systems and methods may be implemented in the context of a wide variety of entertainment devices and systems. FIG. 5 depicts one, non-limiting, example: a system 500 for placeshifting or otherwise transferring data or content, such as a media program (or media content), from a source electronic device 508 to a destination electronic device 504 over a network 506 for presentation to a user (or viewer) on the destination electronic device 504. Thus, media content source 102 of FIG. 1 may be implemented as content source 526, and media device 160 of FIG. 1 may correspond to device 504 or 508. For purposes of explanation, but without limitation, the source device 508 may be alternatively referred to herein as a media device or a placeshifting device, and the destination electronic device 504 may be alternatively referred to herein as a playback device or a client device (or client). The placeshifting system 500 also includes a host server 502 (or host) that communicates or otherwise interacts with the devices 504, 508 over the network 506 to facilitate establishment of a peer-to-peer connection 580 over the network 506, which may be utilized for a placeshifting session, as described in greater detail below. It should be understood that FIG. 5 is a simplified representation of the placeshifting system 500 for purposes of explanation is not intended to limit the subject matter described herein in any way.

In practice, the client device 504 may be any device, component, module, hardware and/or the like that is capable of communicating with the server 502 over network 506. For example, depending on the embodiment, client device 504 may be realized as a conventional personal computer, portable computer, a tablet computer, workstation and/or other computing system, a mobile (or cellular) telephone, a smartphone, a personal digital assistant, a video game player, and/or any other device capable of receiving media programs via the network 506 and presenting audio and/or visual content. In this regard, the client device 504 includes a display device, such as a monitor, screen, or another conventional electronic display, capable of graphically presenting visual content, data and/or information that is generated or otherwise provided by an application 505, 507 executing on the client 504. The client device 504 may further include a user input device, such as a keyboard, a mouse, a touchscreen, or the like, capable of receiving input data and/or other information from the user of the client device 504. The client device 504 also includes a processing system and a data storage element (or memory) that is coupled to or otherwise accessed by the processing system and stores programming instructions that, when read and executed, cause the processing system of the client device 504 to generate one or more applications 505, 507, 509 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

The client 504 may reside at a geographic location that is remote or otherwise physically distinct from the geographic location of the media device 508. In this regard, the media device 508 may have an essentially fixed or permanent geographic location, whereas the geographic location of the client 504 may be transient or otherwise variable with respect to the location of the media device 508. For example, the media device 508 may be realized as a set-top box or a similar device that resides at a user's home for providing media content to the user's television or other home display device 540, while the client 504 is realized as a portable electronic device, such as a mobile phone or other mobile computing device, that moves about with the user.

In the embodiment shown in FIG. 5, client device 504 executes a conventional browser or other client application 505 that is compatible with standard Internet, world wide web (WWW), transmission control protocol, and/or Internet Protocol (TCP/IP), and/or other formats. Such browsers are typically capable of displaying active or other documents formatted in accordance with published protocols and/or computer languages (e.g., hypertext markup language (HTML), extensible markup language (XML), cascading style sheets (CSS), Javascript, and/or the like). Many browsers are also capable of executing "plugin" applications, applets or the like. Such plugins may be formatted in accordance with ActiveX, JAVA, Javascript and/or any number of other formats. A number of commonly used web browsers are available for a number of different computing platforms, and the subject matter described herein is not limited to any particular browser application. In the illustrated embodiment, client 504 further includes a media player application 507. The media player 507 may be a standalone media player, or the media player 507 may be implemented as a plugin or other applet that runs within the client application 505 as desired. In some embodiments, media player 507 is initially obtained from a networked host, such as server 502. The media player 507 may be retrieved on an as-needed basis in some embodiments, or may be stored at client 504 for subsequent execution.

With continued reference to FIG. 5, in exemplary embodiments, media device 508 is any form of device, module, component, hardware and/or the like capable of receiving and processing media content from one or more content sources. For example, in some embodiments, media device 508 is a set-top box (STB) or similar system that is able to receive television programming and/or to record certain programs that can be viewed on a display device 540, such as a television, monitor, liquid crystal display (LCD), light emitting diode (LED) display, plasma display, or the like. Exemplary embodiments of media device 508 will therefore include or otherwise be coupled to a receiver interface 542 for receiving satellite, cable and/or broadcast programming signals from broadcast sources 512, as well as a data storage medium 510 (e.g., a hard disk, flash memory, or another suitable non-volatile data storage element) to support a digital video recorder (DVR) feature and/or functionality, a display interface 544 for providing imagery to the display device 540, and a control module 546 that directs the operations of the media device 508 as appropriate. For convenience, but without limitation, the data storage medium 510 is alternatively referred to herein as a DVR. Media device 508 may also include one or more interfaces 548 to the network 506 and/or an input/output interface 550 to a remote control or other device for providing user inputs to the media device 508, as appropriate. For example, the network interface(s) 548 of the media device 508 may include an interface or port for a wired communications layer (e.g., an Ethernet port or adapter), an interface for a wireless communications layer (e.g., an IEEE 802.11-compatible transceiver), and/or the like.

The components in media device 508 may be provided within a common chassis or housing as depicted in FIG. 5, although equivalent embodiments may implement media device 508 with any number of inter-connected but discrete components or systems. For example, in some embodiments, the media device 508 may be realized as a combination of a STB and a placeshifting device, wherein some features of the media device 508 (e.g., the DVR 510, the receiver 542, the display interface 544, and/or I/Os 550) are implemented by the STB and other features of the media device 508 (e.g., the network interface 548) are implemented by the placeshifting device, wherein the placeshifting device works in conjunction with the STB to shift the viewing experience from a home television (e.g., display device 540) to a viewing display on the client device 504 that is accessed via the network 506. Examples of placeshifting devices that may be used in some embodiments of media device 508 could include any of the various SLINGBOX products available from Sling Media of Foster City, California, although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 508 may be a hybrid DVR and/or receiver, for example, that also provides transcoding and placeshifting features. It should be appreciated that FIG. 5 depicts merely one exemplary embodiment of a media device 508, and in practice, the media device 508 may be logically and physically implemented in any manner to suit the needs of a particular embodiment.

In the exemplary embodiment illustrated in FIG. 5, media device 508 is capable of receiving digital broadcast satellite (DBS) signals transmitted from a broadcast source 512, such as a satellite, using an antenna 552 that provides received signals to the receiver 542. Equivalent embodiments, however, could receive programming at receiver 542 from any sort of cable connection, broadcast source, removable media, network service, external device and/or the like. In some embodiments, the media device 508 may also include an access card interface or card reader 554 adapted to receive an access card 560 (or viewing card) configured to ensure that the viewer is authorized to view media content provided to the primary display device 540. In this regard, the access card 560 includes unique identification information associated with a particular subscriber to the broadcast content source 512 or otherwise includes subscription information that facilitates receiving and/or decoding media content provided by the broadcast content source 512.

The DVR 510 feature stores recorded programming (e.g., recorded broadcast programming received via receiver 542) on a hard disk drive, memory, a networked server, or other storage medium as appropriate in response to user/viewer programming instructions, wherein the recorded programming may be subsequently viewed via the media device 508, either on display device 540 or client device 504 via network 506. Content stored in DVR 510 may be any sort of file-based programming or other content that is accessible to media device 508. In various embodiments, in addition to storing broadcast programming, the DVR 510 may also store programming received from other sources not illustrated in FIG. 5, such as, for example, programming downloaded from an on-demand programming source or an online programming source. Additionally, content in DVR 510 may be stored in any sort of compressed or uncompressed format, as desired, and may be encoded or transcoded as desired for effective receipt, storage, retrieval and playing.

The control module 546 is any sort of hardware, circuitry, processing logic and/or other components capable of directing the operations of media device 508. In various embodiments, control module 546 includes software or firmware logic and/or other programming instructions residing in memory and executing on any sort of processing system, such as any sort of processor, microprocessor, microcontroller, digital signal processor or the like. The instructions, when read and executed, cause the control module 546 to perform various tasks, functions, processes and/or operations and otherwise support the subject matter described herein. In various embodiments, the control module 546 is based upon a "system on a chip" (SoC) implementation that incorporates a hybrid microcontroller with memory, input/output and other features to perform the various signal processing and other actions of media device 508. Other embodiments may implement control module 546 and/or the other features of media device 508 with any number of discrete and/or integrated processing components (e.g., any sort of microprocessor or microcontroller), memories, input/output features and/or other features as desired. The control module 546 communicates with the network interface 548 to establish a peer-to-peer connection 580 to the client device 504 over the network 506 and support streaming of media programs (e.g., from the DVR 510 or the receiver 542) to the client device 504 over the network 506 via the peer-to-peer connection 580, as described in greater detail below.

In the embodiment of FIG. 5, the network 506 is any communications network (or a combination of communications networks) capable of transmitting data between devices within the system 500. In various embodiments, network 506 includes any number of public or private data connections, links or networks supporting any number of communications protocols. Network 506 may include the Internet, for example, or any other network. Such networks may be based upon TCP/IP or other conventional protocols, although other embodiments may use any type of alternate or successor protocols, as desired. In various embodiments, network 506 may also incorporate a wireless and/or wired telephone network, such as a cellular communications network for communicating with mobile phones, personal digital assistants, and/or the like. Various embodiments of network 506 may also incorporate any sort of wireless or wired local area networks (LANs), wide area networks (WAN), or the like.

In the illustrated embodiment of FIG. 5, the server 502 may be realized as one or more server computers or other device(s) coupled to the network 506 and capable of interacting with the devices 504, 508 to facilitate communications between the client device 504 and the media device 508 associated with the user or operator of the client 504. The server 502 may be implemented with a server computer system or data processing system that is based upon any processor, architecture and/or operating system, and will typically be implemented using a processing system 530, memory 532, and input/output features 534. Various embodiments may be implemented using dedicated or shared hardware servers; other implementations may make use of virtual server features as part of a "cloud computing" service, such as any of the cloud computing services provided by any number of providers.

While FIG. 5 illustrates a single server 502, many practical embodiments of the system 500 may provide a cluster or other collection of multiple host servers 502 to support any desired number of simultaneous communications with multiple clients 504 and/or multiple media devices 508. This cluster may also incorporate appropriate routing, load balancing, access and security mechanisms and or any number of other features. In various embodiments, each server 502 is an actual or virtual computer system executing an operating system 536 in conjunction with the processing system 530, memory 532 and/or I/O features 534 to provide a computing core that is capable of executing a portal application 538, as well as any number of daemons, processes, applications or other modules as desired. For example, a portal application 538 could execute as a daemon on the server 502, with connections to separate clients 504 being managed as separate processes or instances that communicate with portal application 538 using features provided by operating system 536. In one or more embodiments, the memory 532 stores programming instructions that, when read and executed, cause the processing system 530 to create, generate, or otherwise facilitate the portal application 538 and perform various tasks, functions, processes and/or operations described herein. In this regard, the memory 532 represents any non-transitory short or long term data storage element or other computer-readable media capable of storing programming instructions for execution by or on the processing system 530.

The user of the client 504 is able to connect to the portal application 538 supported by host 502 via the network 506, for example, by directing the client application 505 to a URL or other network address associated with host 502 and/or portal application 538. In exemplary embodiments, after the user is successfully authenticated by the portal application 538, the host 502 and/or portal application 538 establishes a connection 570 over the network 506 to the media device 508 that is associated with the user. Thereafter, the host 502 and/or the portal application 538 utilizes the connection 570 to obtain, from the media device 508 via the network 506, information about programming stored at the media device 508 and available for placeshifting to the client device 504, such as, for example, a listing of the media programs stored on DVR 510. It should be noted that although FIG. 5 depicts the network connection 570 as being between the host 502 and the media device 508, in practice, the placeshifting system 700 may include one or more intermediary components (e.g., one or more message servers) configured to establish, facilitate, or otherwise support the connection 570.

Server 102 is coupled to an electronic program guide 122, which may be realized as a server, a database, or another device operating on the network 106 that maintains information pertaining to current and/or future broadcasts (or airings) of media programs that are available to be received from broadcast source 112 (e.g., by the media device 108 via receiver 142 and/or antenna 152). The server 102 and/or the portal application 138 may obtain information pertaining to current and/or future broadcasts (or airings) of media programs from the electronic program guide 122 and generate or otherwise provide a program guide graphical user interface (GUI) display on the client device 104 (e.g., within client application 105) that indicates media programs that are or will be available for streaming from the media device 108. The user of the client device 104 may manipulate or otherwise utilize the graphical user interface (or the graphical user interface elements contained therein) to select or otherwise identify media programs for streaming to the client device 104 and/or recording to the DVR 110. The user may pause or otherwise stop presentation of the streamed media program and manipulate or otherwise operate the client application 105 to transmit or otherwise provide 412, via the network 106, a request for content to a third-party content source 126 (e.g., a third-party website). The third-party content source 126 responds to the request by transmitting or otherwise providing content to the client device 104 via the network 106.

In the illustrated embodiment of FIG. 1, the placeshifting system 100 also includes a media program database 124 that includes verified or validated metadata and/or other descriptive information for a vast array of media programs. For example, the media program database 124 may contain metadata and/or other descriptive information pertaining to substantially all of the media programs that may be available from one or more content sources within placeshifting system 100 (e.g., information pertaining to any media programs that have previously been aired by a broadcast source 112, along information pertaining to any movie that has been presented in theaters, made available on-demand, or released for individual use (e.g., on digital video disc (DVD) or the like)). In exemplary embodiments, for each media program having a record (or entry) in the media program database 124, the media program database 124 maintains a media data object that includes one or more fields of metadata associated with that media program along with one or more fields of program identifiers that may be used to identify that media program record. In this regard, the program guide 122 and the media program database 124 may utilize the same program identifiers to uniquely identify each media program.

Many other modifications and enhancements could be provided in a wide array of alternate but equivalent embodiments. The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A system for streaming media content from a media content server via a network, the system comprising a processor and a non-transitory data storage configured to store computer-executable instructions that, when executed by the processor, perform an automated process comprising: presenting a user interface on a display, wherein the user interface lists a plurality of available media content programs for a selection by a user of the system; determining a predicted media content program, comprising selecting the predicted media content program based on the user's historical interaction with the user interface, wherein the predicted media content program is at least one of the plurality of available media content programs, and wherein the user's historical interaction with the user interface comprises a learned likelihood, based on a plurality of historical data for the user, of the user of selecting each of the plurality of available media content programs; obtaining, prior to receiving the selection by the user, a manifest associated with the predicted media content program from the media content server, wherein the manifest comprises location information for each of a plurality of different segments of the predicted media content program; obtaining, prior to receiving the selection by the user and based on the obtained manifest, at least one segment of the predicted media content program from the media content server via the network; and displaying the obtained at least one segment upon the selection by the user of the predicted media content.

2. The system of claim 1, wherein the automated process comprises obtaining media segments corresponding to multiple media content programs of the plurality of available media content programs until the user selects one of the available media content programs for playback, wherein the media segments are obtained from the media content server based upon the location information contained in received manifests associated with the multiple media content programs.

3. The system of claim 1, wherein the learned likelihood is further based on a popularity of the available media content programs.

4. The system of claim 3, wherein the user interface is configured to display the available media content programs sorted by popularity.

5. The system of claim 1, wherein the predicted media content program selection is further based on the available media content program of the plurality of available media content programs that is currently highlighted on the user interface.

6. The system of claim 1, wherein the learned likelihood comprises a machine learning model.

7. The system of claim 1, wherein the location information in the manifest further associates the plurality of different segments of the predicted media content program with two or more bitrate encoded versions of the respective segments.

8. The system of claim 1, further comprising: in response to a second plurality of available media content programs for selection by the user being presented on the display, selecting a second predicted media content based on the user's historical interaction with the user interface.

9. An automated process performed by a media player device having a processor, a data storage, and an interface to a network, the automated process comprising: presenting a user interface on a display, wherein the user interface lists a plurality of available media content programs for a selection by a user of the media player device; determining a predicted media content program, comprising selecting the predicted media content program based on the user's historical interaction with the user interface, wherein the predicted media content program is at least one of the plurality of available media content programs, and wherein the user's historical interaction with the user interface comprises a learned likelihood, based on a plurality of historical data for the user, of the user of selecting each of the plurality of available media content programs; obtaining, prior to receiving the selection by the user, a manifest associated with the predicted media content program from a media content server via the network, wherein the manifest comprises location information for each of a plurality of different segments of the predicted media content program; obtaining, prior to receiving the selection by the user and based on the obtained manifest, at least one segment of the predicted media content program from the media content server via the network; and displaying the obtained at least one segment upon the selection by the user of the predicted media content.

10. The automated process of claim 9, comprising obtaining media segments corresponding to multiple media content programs of the plurality of available media content programs until the user selects one of the available media content programs for playback, wherein the media segments are obtained from the media content server based upon the location information contained in received manifests associated with the multiple media content programs.

11. The automated process of claim 9, wherein the learned likelihood is further based on a popularity of the available media content programs.

12. The automated process of claim 11, wherein the user interface is configured to display the available media content programs sorted by popularity.

13. The automated process of claim 9, wherein the predicted media content program selection is further based on the available media content program of the plurality of available media content programs that is currently highlighted on the user interface.

14. The automated process of claim 9, wherein the learned likelihood comprises a machine learning model.

15. The automated process of claim 9, wherein the location information in the manifest further associates the plurality of different segments of the predicted media content program with two or more bitrate encoded versions of the respective segments.

16. The automated process of claim 9, further comprising: in response to a second plurality of available media content programs for selection by the user being presented on the display, selecting a second predicted media content based on the user's historical interaction with the user interface.

17. An automated process performed by a media player device having a processor, a data storage, and an interface to a network, the automated process comprising: presenting, on a display, a plurality of available media content programs for a selection by a user of the media player device; determining a predicted media content program, comprising selecting the predicted media content program based on a learned user behavior, wherein: the predicted media content program is at least one of the plurality of available media content programs; the learned user behavior is based on a plurality of historical data for the user; wherein the learned user behavior comprises the user's historical interaction with a user interface on which the plurality of available media content programs is presented; and the learned user behavior comprises a machine learning model; obtaining, prior to receiving the selection by the user, a manifest associated with the predicted media content program from a media content server via the network, wherein the manifest comprises location information for each of a plurality of different segments of the predicted media content program;

obtaining, prior to receiving the selection by the user and based on the obtained manifest, at least one segment of the predicted media content program from the media content server via the network; and displaying the obtained at least one segment upon the selection by the user of the predicted media content.

18. The automated process of claim 17, wherein the learned user behavior is further based on a popularity of the available media content programs.

19. The automated process of claim 17, wherein the machine learning model is updated over time based on additional user historical interaction with the user interface.

\* \* \* \* \*